United States Patent
Maeda et al.

(10) Patent No.: US 7,316,856 B2
(45) Date of Patent: Jan. 8, 2008

(54) SEPARATOR FOR FLAT-TYPE POLYELECTROLYTE FUEL CELL AND POLYELECTROLYTE FUEL CELL EMPLOYING THAT SEPARATOR

(75) Inventors: Takanori Maeda, Tokyo (JP); Hiroshi Yagi, Tokyo (JP); Yoshinori Oota, Tokyo (JP)

(73) Assignee: Dai Nippon Insatsu Kabushiki Kaisha, Tokyo (JP)

( * ) Notice: Subject to any disclaimer, the term of this patent is extended or adjusted under 35 U.S.C. 154(b) by 633 days.

(21) Appl. No.: 10/477,600

(22) PCT Filed: May 13, 2003

(86) PCT No.: PCT/JP03/05936

§ 371 (c)(1),
(2), (4) Date: Nov. 13, 2003

(87) PCT Pub. No.: WO03/098726

PCT Pub. Date: Nov. 27, 2003

(65) Prior Publication Data

US 2004/0137308 A1    Jul. 15, 2004

(30) Foreign Application Priority Data

May 15, 2002  (JP) .............................. 2002-140202
Aug. 5, 2002  (JP) .............................. 2002-227871

(51) Int. Cl.
*H01M 2/02*    (2006.01)
(52) U.S. Cl. .............................. 429/34; 429/38; 429/32; 429/35

(58) Field of Classification Search ............... 429/34, 429/35, 37, 38, 39, 32
See application file for complete search history.

(56) References Cited

U.S. PATENT DOCUMENTS 5,543,241 A    8/1996  Nishioka et al.

(Continued)

FOREIGN PATENT DOCUMENTS

JP    6-338333    12/1994

(Continued)

OTHER PUBLICATIONS

Yuichi Kamo, "Chokusetsu Methanol-kei Nenryo Denchi", Dai 41 Kai Denki Kagaku Seminar Text, Denki Kagaku Kai Kansai Shibu, pp. 29-38 Jul. 13, 2001.

(Continued)

*Primary Examiner*—Raymond Alejandro
(74) *Attorney, Agent, or Firm*—Oblon, Spivak, McClelland, Maier & Neustadt, P.C.

(57) ABSTRACT

A separator having a separator member coupled body having a metal plate as a base body, and formed by integrally coupling a plurality of separator members each having through holes for feeding fuel to an electrolyte of the fuel cell, the through holes arranged so as to correspond to the unit cell and to be perpendicular to a surface of the base body, and frame coupled bodies each made of an insulating material, each having openings for fuel feeding or oxygen feeding corresponding to the respective separator members, and each formed by integrally coupling a plurality of frame portions that give insulation between the unit cells, wherein the frame coupled bodies, making a pair, sandwich the separator member coupled body from its both sides, and each frame portion of one of the frame coupled bodies is capable of fitting a membrane electrode assembly of the fuel cell into the opening.

9 Claims, 11 Drawing Sheets

U.S. PATENT DOCUMENTS

| | | | |
|---|---|---|---|
| 6,475,655 B1 * | 11/2002 | Nakanishi et al. | 429/19 |
| 2002/0127450 A1 * | 9/2002 | Xie | 429/30 |
| 2003/0068523 A1 * | 4/2003 | Kaneta et al. | 428/670 |
| 2004/0197467 A1 * | 10/2004 | Nakata et al. | 427/123 |

FOREIGN PATENT DOCUMENTS

| | | |
|---|---|---|
| JP | 8-171925 | 7/1996 |
| JP | 8-273696 | 10/1996 |
| JP | 2001-176520 | 6/2001 |
| JP | 2003-203647 | 7/2003 |

OTHER PUBLICATIONS

U.S. Appl. No. 10/477,600, filed Nov. 13, 2003, Maeda et al.
U.S. Appl. No. 11/697,454, filed Apr. 6, 2007, Yagi et al.

* cited by examiner

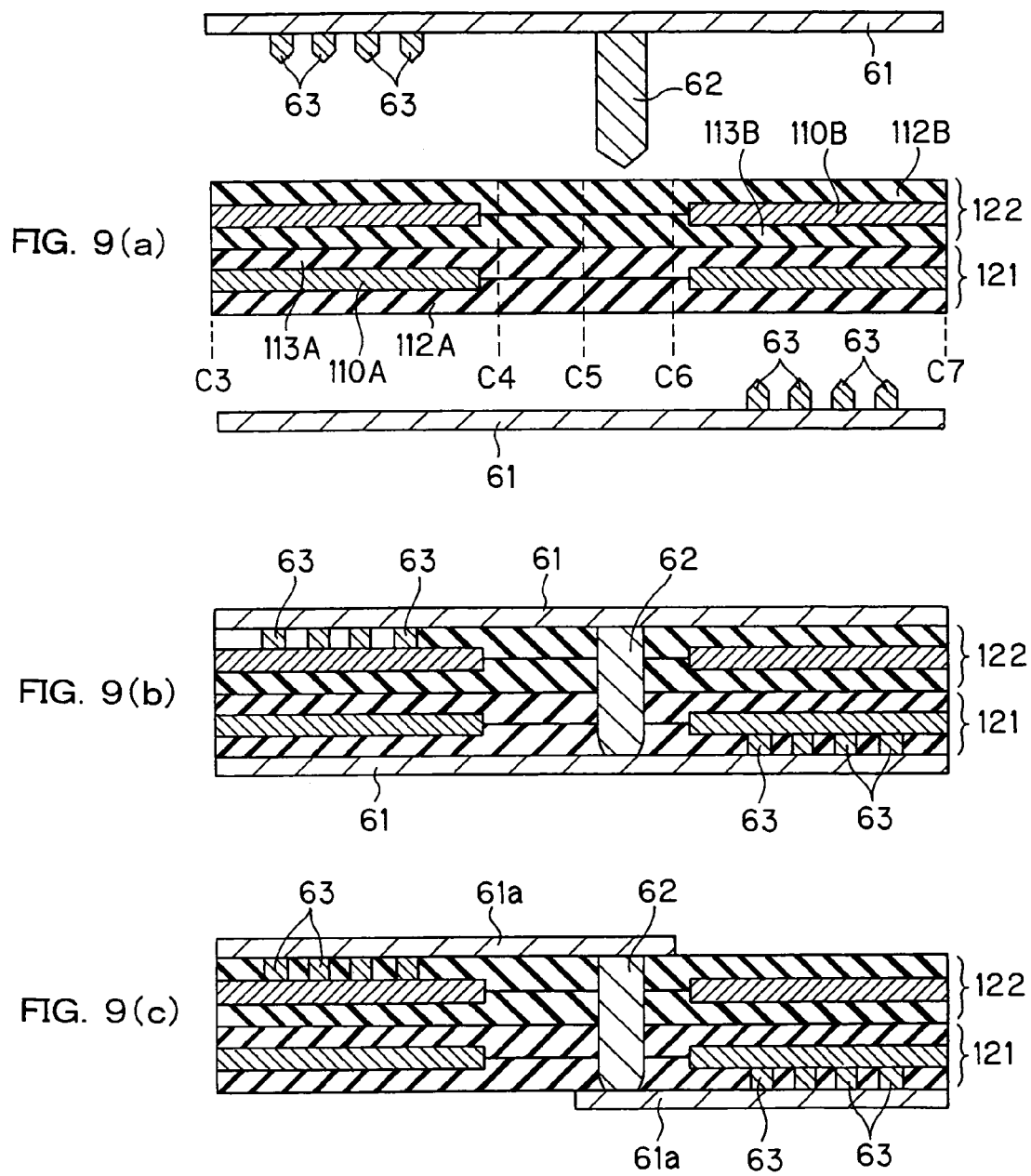

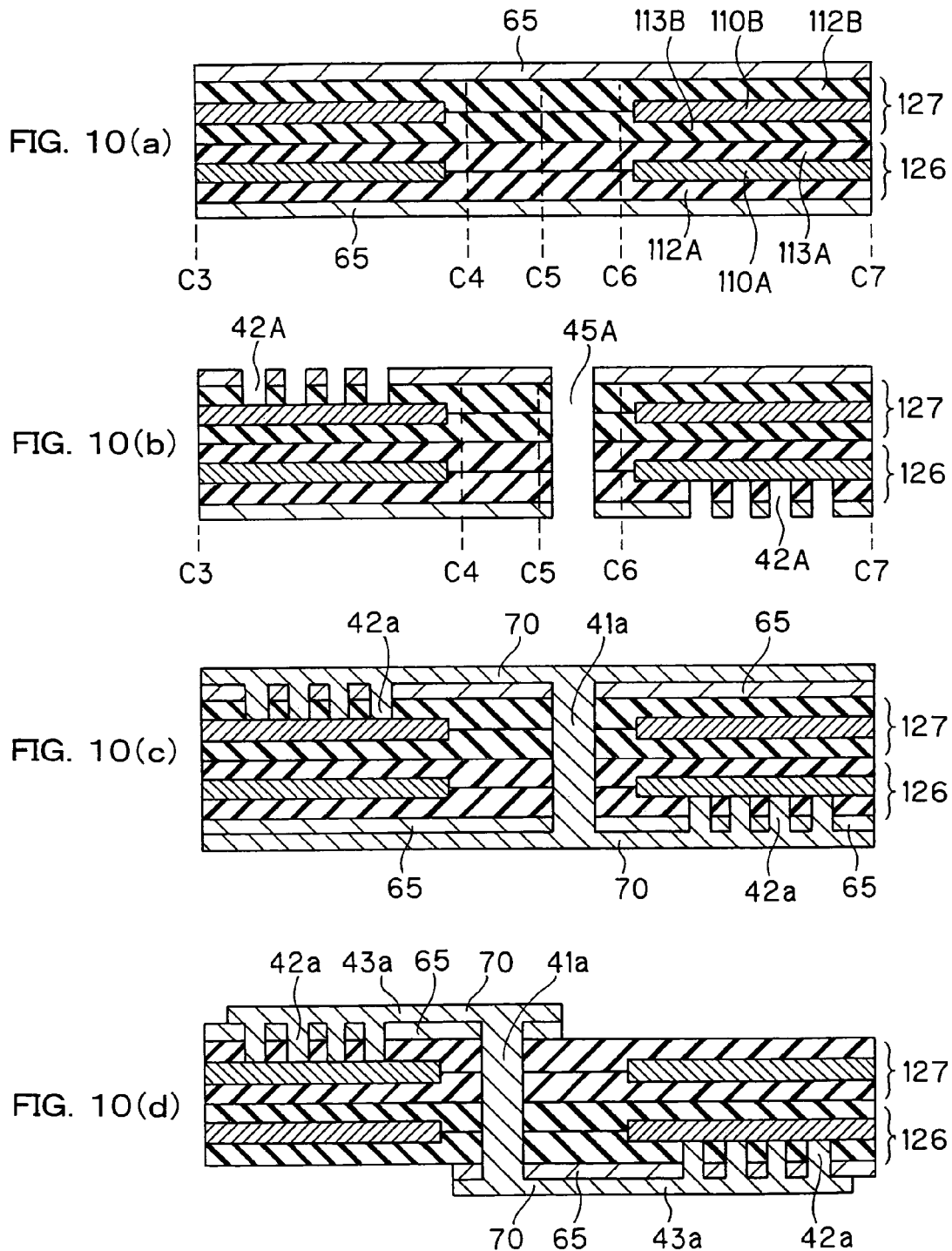

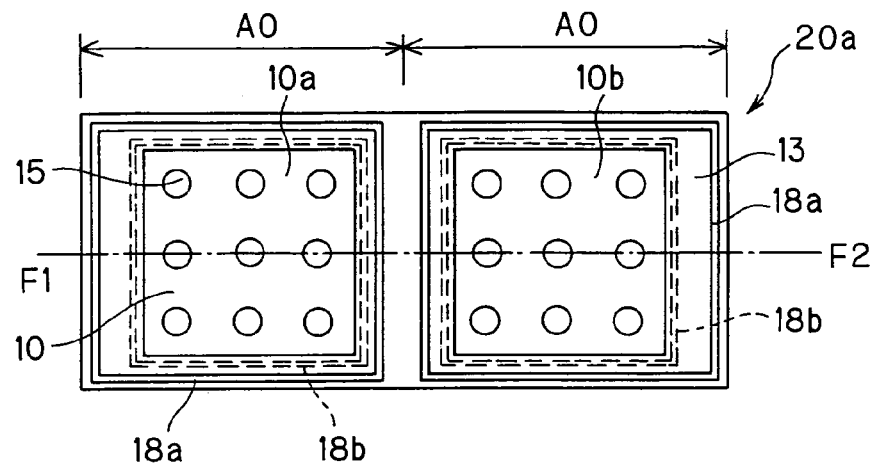
FIG. 13(a)
FIG. 13(b)
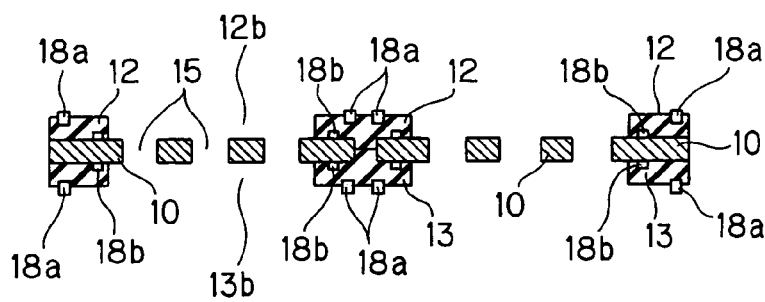
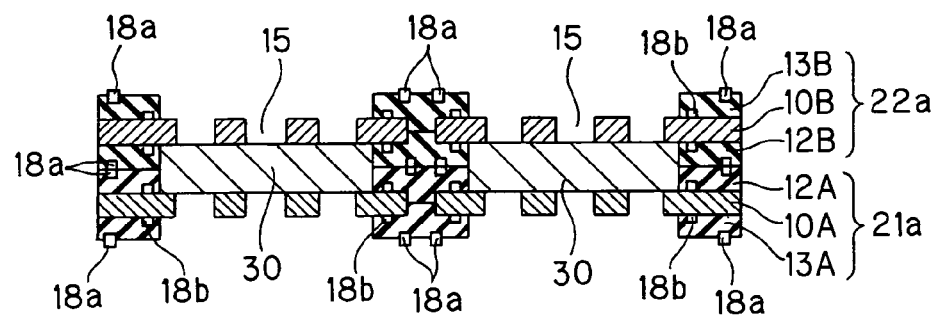
FIG. 14

SEPARATOR FOR FLAT-TYPE POLYELECTROLYTE FUEL CELL AND POLYELECTROLYTE FUEL CELL EMPLOYING THAT SEPARATOR

TECHNICAL FIELD

The present invention relates to a fuel cell and, in particular, relates to a separator for a flat-type polymer electrolyte fuel cell, and a polymer electrolyte fuel cell using such a separator.

BACKGROUND ART

A fuel cell is a device wherein fuel (reducing agent) and oxygen or air (oxidizing agent) are continuously supplied from the exterior to be reacted electrochemically, thereby to produce electrical energy, and fuel cells are classified based on their operating temperatures, kinds of using fuel, applications and so forth. On the other hand, recently, they are, in general, roughly classified into five kinds, i.e. a solid oxide fuel cell, a molten carbonate fuel cell, a phosphoric acid fuel cell, a polymer electrolyte fuel cell, and an alkaline aqueous solution fuel cell, mainly depending on kinds of using electrolytes.

These fuel cells are of the type using hydrogen gas produced from methane etc. as fuel. Recently, however, there is also known a direct methanol fuel cell (hereinafter also referred to as DMFC) wherein a methanol aqueous solution is directly used as fuel.

Among them, attention has been paid to a solid polymer fuel cell (hereinafter also referred to as PEFC) having a structure wherein a solid polymer membrane is sandwiched between two kinds of electrodes, and further, these members are sandwiched between separators.

In general, this PEFC is in the form of a stack structure wherein a plurality of unit cells each having electrodes arranged on both sides of a solid polymer membrane, respectively, are stacked so as to increase an electromotive force thereof depending on the purpose. A separator disposed between the unit cells is generally formed on one side thereof with a fuel gas feed groove for feeding fuel gas to one of the adjacent unit cells. In case of such a separator, fuel gas and oxidant gas are supplied along the surfaces of the separator.

As the PEFC separators, there are known a separator obtained by planing a graphite board and applying a grooving process thereto, a molded separator of a carbon compound obtained by kneading carbon into resin, a metal separator applied with a grooving process by etching or the like, a separator wherein the surface of a metal material is coated with anticorrosive resin, and so forth. These separators are each formed with a fuel gas feed groove and/or an oxidant gas feed groove according to requirements.

Like a fuel cell for a portable terminal, for example, there are also those instances where an electromotive force is not required so much, but it is required to be of the flat type and as thin as possible, other than the fuel cell of the stack structure. However, there has also been a problem that the feeding of fuel and oxygen becomes uneven depending on places in case of the flat type wherein a plurality of unit cells are arranged in a flat manner and electrically connected in series.

In view of this, for improving this unevenness of the fuel feeding, there has been considered a separator having a structure wherein many through holes are formed in a perpendicular direction relative to a surface of the separator contacting a membrane electrode assembly (MEA), and fuel and oxygen are fed via the through holes.

Herein, an assembly including electrode portions located between a fuel-feed-side separator of a fuel cell and an oxygen-feed-side separator thereof, for example, an assembly such as a membrane composed of a collector layer, a fuel electrode, a polymer electrolyte, an oxygen electrode, and a collector layer that are stacked in the order named, is called a membrane electrode assembly (MEA).

However, if the separator having the foregoing structure is formed, for example, only from a metal material, it is necessary to increase a thickness of the separator in view of strength so that reduction in weight of a fuel cell becomes difficult.

As described above, in recent years, the possibility has been increased for the fuel cells to be widely used and, in case of the PEFC, there has also been required such a one that is of the flat type and as thin as possible. However, with respect to the separator, sufficient strength and further reduction in weight have been required, and further, there has been required such a one that has a sealing function for preventing fuel, moisture etc. inside a cell from leaking out to the exterior of the cell from portions other than a fuel feed surface when it is employed in a polymer electrolyte fuel cell.

DISCLOSURE OF THE INVENTION

The present invention copes with them and provides a separator that can ensure a strength required for the separator and deal with further reduction in weight, and further provides a separator that has a sealing function for preventing fuel, moisture etc. inside a cell from leaking out to the exterior of the cell from portions other than a fuel feed surface when it is employed in a polymer electrolyte fuel cell, in addition to ensuring the strength required for the separator and the further reduction in weight.

Simultaneously, using such a separator and utilizing a conventional front-back connecting method for a double-sided printed wiring board, it aims to realize a polymer electrolyte fuel cell in which unit cells can be easily and simply connected to each other and which enables reduction in weight and improvement in strength.

For accomplishing these objects, the present invention is configured such that a separator for a flat-type polymer electrolyte fuel cell having unit cells arranged in a flat manner, which is provided on a fuel feed side or an oxygen feed side, comprises a separator member coupled body having a metal plate as a base body, and formed by integrally coupling a plurality of separator members each having through holes for feeding fuel to an electrolyte of the fuel cell, said through holes arranged so as to correspond to the unit cell and to be perpendicular to a surface of said base body, and frame coupled bodies each made of an insulating material, each having openings for fuel feeding or oxygen feeding corresponding to the respective separator members, and each formed by integrally coupling a plurality of frame members that give insulation between the unit cells, wherein said frame coupled bodies, making a pair, sandwich said separator member coupled body from its both sides, and each frame member of one of the frame coupled bodies on the front and back of said separator member coupled body is capable of fitting a membrane electrode assembly (MEA) of the fuel cell into said opening.

Further, the present invention is configured such that a separator for a flat-type polymer electrolyte fuel cell having unit cells arranged in a flat manner, which is provided on a fuel feed side or an oxygen feed side, comprises a separator member coupled body having a metal plate as a base body, and formed by integrally coupling a plurality of separator members each having through holes for feeding fuel to an electrolyte of the fuel cell, said through holes arranged so as to correspond to the unit cell and to be perpendicular to a surface of said base body, a frame coupled body made of an insulating material, having openings for fuel feeding or oxygen feeding corresponding to the respective separator members, and formed by integrally coupling a plurality of frame members that give insulation between the unit cells, and a solid plate member made of an insulating material, or a stacked base member composed of a solid plate member made of an insulating material and a conductive layer stacked thereon, wherein said frame coupled body and said solid plate member or said stacked base member, making a pair, sandwich said separator member coupled body from its both sides, and each frame member of said frame coupled body is capable of fitting a membrane electrode assembly (MEA) of the fuel cell into said opening.

As described before, in the present invention, an assembly including electrode portions located between a fuel-feed-side separator of a fuel cell and an oxygen-feed-side separator thereof, such as a membrane composed of a collector layer, a fuel electrode, a polymer electrolyte, an oxygen electrode, and a collector layer that are stacked in the order named, is called a membrane electrode assembly (MEA).

Being thus configured, the foregoing separator for the flat-type polymer electrolyte fuel cell of the present invention is capable of providing a separator that can ensure a strength required as the separator, and can deal with further reduction in weight. Further, by providing sealing members, it is possible to provide a separator that has a sealing function for preventing fuel, moisture etc. inside the respective unit cells from leaking out to the exterior of the cells from portions other than fuel feed surfaces when it is employed in the polymer electrolyte fuel cell, in addition to ensuring the strength required for the separator and the further reduction in weight.

Further, the present invention is configured so as to be a flat-type polymer electrolyte fuel cell having unit cells arranged in a flat manner, wherein a set of separators each having a separator member coupled body and a pair of frame coupled bodies arranged so as to sandwich said separator member coupled body from its both sides, confront each other via membrane electrode assemblies (MEAs) of the fuel cell, and said membrane electrode assemblies (MEAs) are fitted into openings at confronting surfaces of said frame coupled bodies, said separator member coupled body has a metal plate as a base body, and is formed by integrally coupling a plurality of separator members each having through holes for feeding fuel to an electrolyte of the fuel cell, said through holes arranged so as to correspond to the unit cell and to be perpendicular to a surface of said base body, and said frame coupled bodies are each made of an insulating material, each having said openings for fuel feeding or oxygen feeding corresponding to the respective separator members, and each formed by integrally coupling a plurality of frame members that give insulation between the unit cells.

Further, the present invention is configured so as to be a flat-type polymer electrolyte fuel cell having unit cells arranged in a flat manner, wherein a set of separators each having a separator member coupled body, a frame coupled body disposed on one side and a solid plate member made of an insulating material or a stacked base member composed of a solid plate member made of an insulating material and a conductive layer stacked thereon, disposed on the other side so as to sandwich said separator member coupled body therebetween, confront each other via membrane electrode assemblies (MEAs) of the fuel cell, and said membrane electrode assemblies (MEAs) are fitted into openings of said frame coupled body, said separator member coupled body has a metal plate as a base body, and is formed by integrally coupling a plurality of separator members each having through holes for feeding fuel to an electrolyte of the fuel cell, said through holes arranged so as to correspond to the unit cell and to be perpendicular to a surface of said base body, and said frame coupled body is made of an insulating material, has said openings for fuel feeding or oxygen feeding corresponding to the respective separator members, and is formed by integrally coupling a plurality of frame members that give insulation between the unit cells.

Being thus configured, the polymer electrolyte fuel cell of the present invention makes it possible to easily and simply connect the unit cells to each other, and realize reduction in weight and improvement in strength in the flat-type PEFC, utilizing the conventional front-back connecting method for a double-sided printed wiring board.

BRIEF DESCRIPTION OF THE DRAWINGS

FIG. 9(c) is a sectional view of a first modification of the fuel cell shown in FIG. 6, and FIGS. 9(a) to 9(c) are fabrication process diagrams of the fuel cell of the first modification.

FIG. 10(d) is a sectional view of a second modification of the fuel cell shown in FIG. 6, and FIGS. 10(a) to 10(d) are fabrication process diagrams of the fuel cell of the second modification.

FIG. 13(a) is a plan view showing a fourth example of an embodiment of a separator for a flat-type polymer electrolyte fuel cell of the present invention, and FIG. 13(b) is a diagram of an F1-F2 section in FIG. 13(a).

FIG. 14 is a sectional view of a polymer electrolyte fuel cell of the present invention using the separator of the fourth example shown in FIG. 13.

BEST MODE FOR CARRYING OUT THE INVENTION

Now, embodiments of the present invention will be described.

In FIGS. 1 to 14, 10 denotes a separator member coupled body, 10A and 10B each denote such ones (also referred to as a separator group) that are in the state where a separator member coupled body is divided for respective cells, 10a and 10b denote separator members, 11 denotes a separator member coupled body, 11a and 11b denote separator members, 12, 12A, 12B, 13, 13A, and 13B denote frame coupled bodies, 12a denotes a frame member, 12b denotes an opening, 12c denotes a projecting portion, 13a denotes a frame member, 13b denotes an opening, 13c denotes a projecting portion, 15 denotes a through hole, 16 denotes an intercell separation through hole, 17 denotes a groove portion, 17a denotes a fuel feed groove or an oxygen feed groove, 18a and 18b denote sealing members, 20, 21, and 22 denote separators, 20a, 21a, and 22a denote separators, 30 denotes a membrane electrode assembly (MEA), 40 denotes a fuel cell, 41 and 42 denote filled via portions, 41a denotes a through hole (through hole for connection between separators), 42b denotes a through hole (through hole for connection between wiring-separator), 43 and 43a denote wiring, 45 and 45A denote through holes, 46 and 46A denote hole portions, 50 denotes a housing, 61 denotes copper foil, 61a denotes wiring, 62 and 63 denote bumps, 65 denotes copper foil, 70 denotes a plating portion, 110 denotes a separator member coupled body, 112, 112A, and 112B denote solid plate members, 112c denotes a projecting portion, 113a denotes a frame member, 113b denotes an opening, 113, 113A, and 113B denote frame coupled bodies, 115 denotes a through hole, 120, 121, 122, 125, 126, and 127 denote separators, and 130 denotes a conductive layer (copper foil).

Figure 1A:
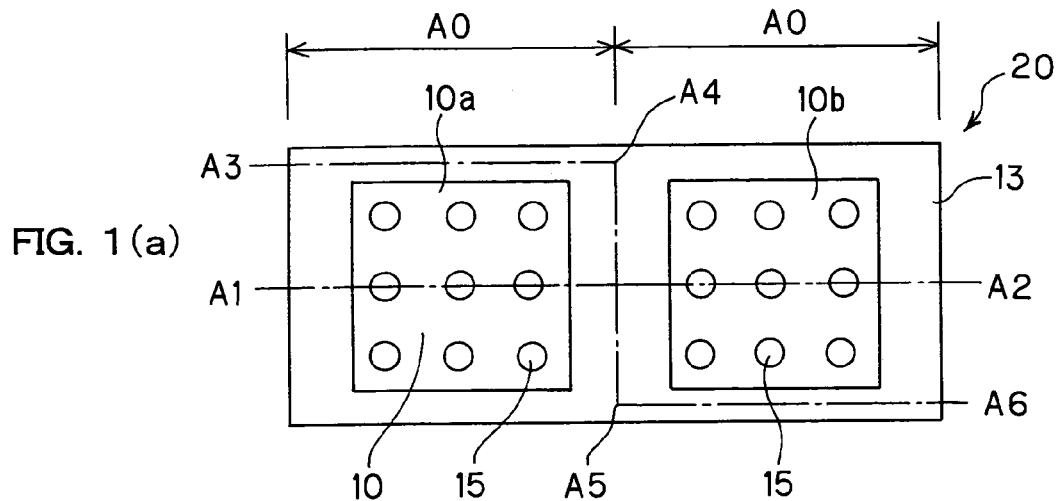
FIG. 1(a) is a plan view showing a first example of an embodiment of a separator for a flat-type polymer electrolyte fuel cell of the present invention.
Figure 3A:
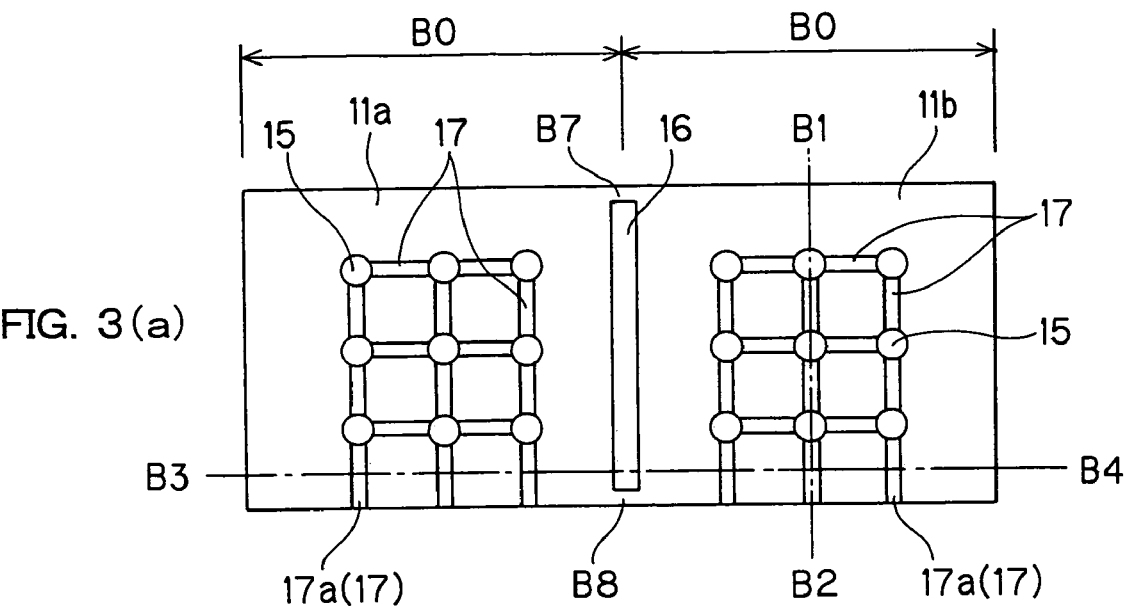
FIG. 3(a) is a plan view showing a first mode example of a separator member coupled body.
Figure 3B:
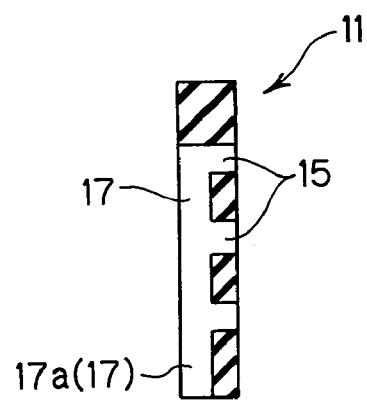
FIG. 3(b) is a sectional view taken along B1-B2 of FIG. 3(a)
Figure 3C:
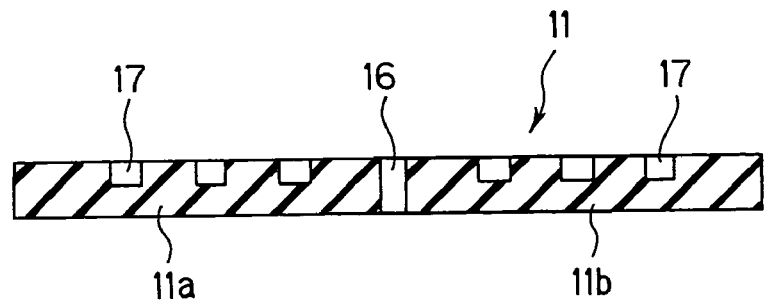
FIG. 3(c) is a sectional view taken along B3-B4 of FIG. 3(a).

A0 in FIG. 1(a) and B0 in FIG. 3 represent unit cell regions, respectively.

Figure 11:
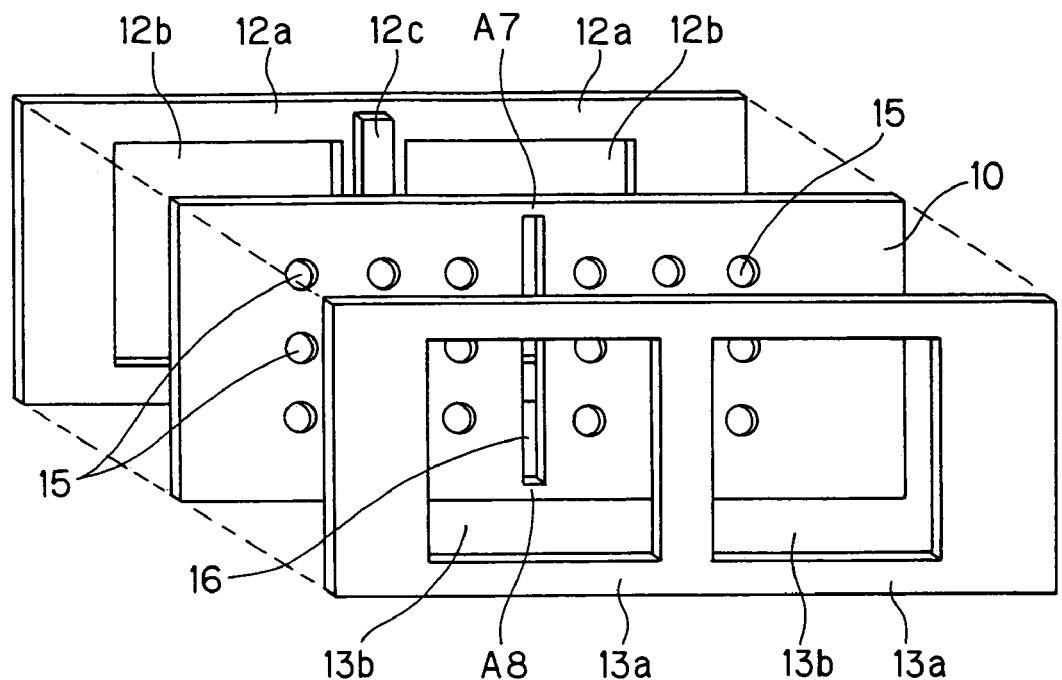
FIG. 11 is a diagram showing respective members in FIG. 1(a) by spacing positions thereof apart from each other.
Figure 12:
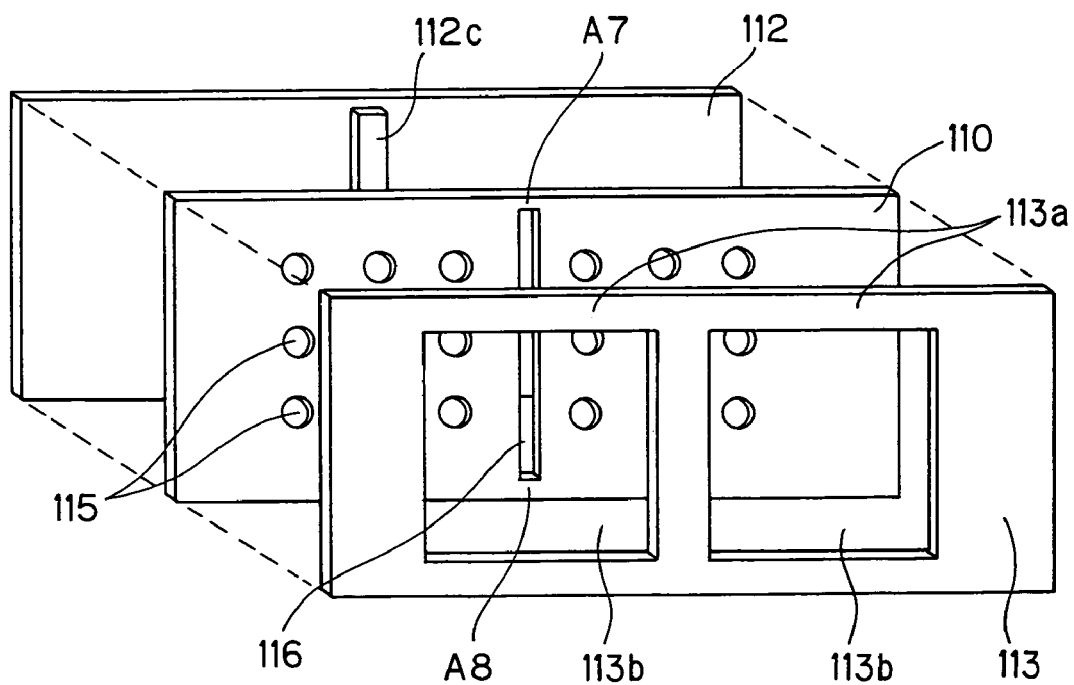
FIG. 12 is a diagram showing respective members in FIG. 4 by spacing positions thereof apart from each other.

Further, A7 and A8 in FIGS. 2, 11 and 12, and B7 and B8 in FIG. 3 represent joining portions (also referred to as coupling portions).

First, a first example of an embodiment of a separator for a flat-type polymer electrolyte fuel cell of the present invention will be described based on FIGS. 1, 2 and 11.

A separator 20 of the first example is a separator that is disposed on a fuel feed side or an oxygen feed side of the flat-type polymer electrolyte fuel cell in which unit cells are arranged in a flat manner. This separator 20 is fed with fuel or oxygen in a direction perpendicular to the separator, and is a separator for fabricating a fuel cell provided with two unit cells.

The foregoing separator 20 has a separator member coupled body 10 having a metal plate as a base body, and frame coupled bodies 12 and 13 that are arranged on front and back sides of the separator member coupled body 10 so as to sandwich the separator member coupled body 10 therebetween.

The separator member coupled body 10 comprises a plurality of separator members corresponding to unit cells, i.e. two separator members 10a and 10b in the shown example, which are integrally coupled to each other. This separator member coupled body 10 is formed with a plurality of through holes 15, corresponding to the unit cells, for feeding fuel to an electrolyte of the fuel cell, which are arranged so as to be perpendicular to the surface of the separator member coupled body.

On the other hand, each of the frame coupled bodies 12 and 13 is made of an insulating material, and comprises frame members 12a or 13a for giving insulation between the unit cells, which are integrally coupled to each other. Each of the frame coupled bodies 12 and 13 has openings 12b or 13b for fuel feeding or oxygen feeding, corresponding to the separator members 10a and 10b, respectively.

Figure 2A:
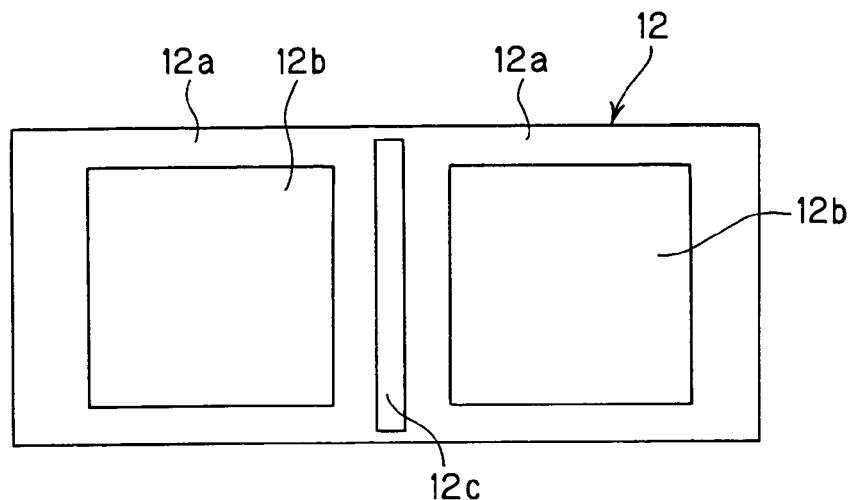
FIG. 2(a) is a plan view wherein a frame coupled body in FIG. 1 is seen from a side A9 of FIG. 1(b)
Figure 2B:
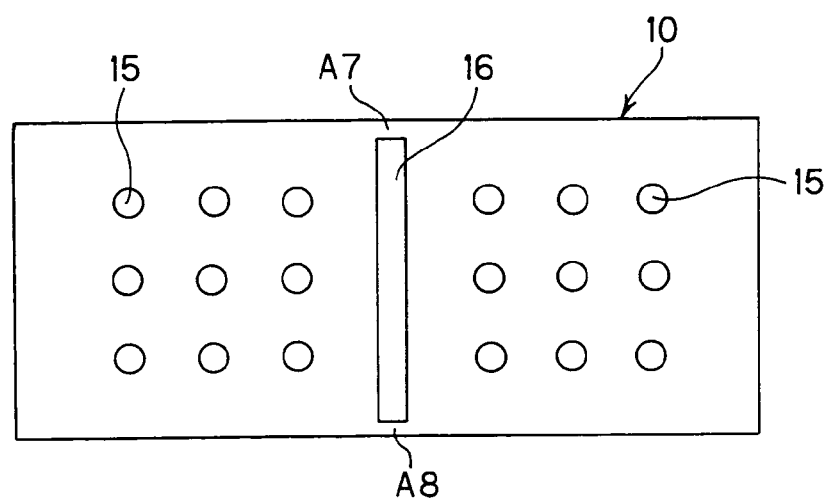
FIG. 2(b) is a plan view wherein a separator member coupled body in FIG. 1 is seen from the side A9 of FIG. 1(b)
Figure 2C:
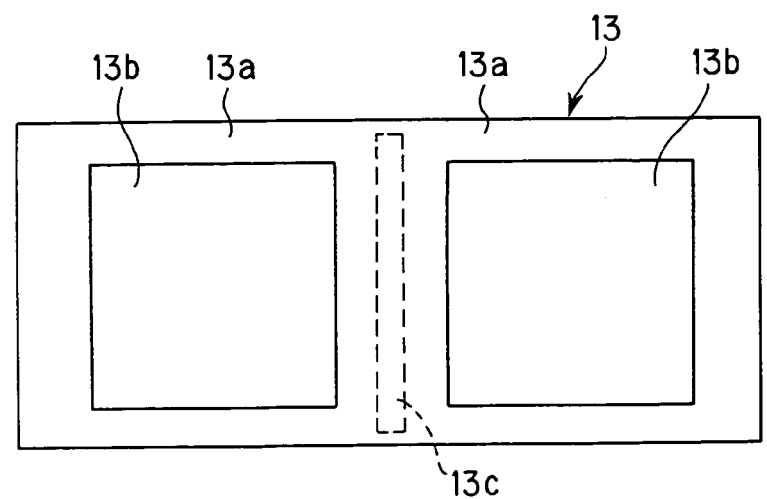
FIG. 2(c) is a plan view wherein a frame coupled body in FIG. 1 is seen from the side A9 of FIG. 1(b).

Upon stacking the frame coupled body 12, the separator member coupled body 10, and the frame coupled body 13 to fabricate the separator 20, a projecting portion 12c (see FIG. 2(a)) of the frame coupled body 12 and a projecting portion 13c (see FIG. 2(c)) of the frame coupled body 13 are respectively fitted into an intercell separation through hole 16 of the separator member coupled body 10 so as to be closely contacted together.

Either of the openings 12b and the openings 13b of the frame coupled bodies 12 and 13 disposed on the front and back sides of the separator member coupled body 10 each have a shape into which a membrane electrode assembly (MEA) of the fuel cell is fitted.

The separator member coupled body 10 having the metal plate as the base body may be provided with a protective layer (not shown) in the form of an anticorrosive (weak acid resistant) and electrically conductive resin layer, at least on a surface portion of the base body that will be on the side of the electrolyte of the fuel cell.

There is no particular limitation about the separator member coupled body 10 as long as it can bear the use of fuel, is anticorrosive (weak acid resistant) and electrically conductive, and has a predetermined strength.

The separator member coupled body 10 is obtained by processing a metal base body into a predetermined shape through mechanical processing and etching processing using the photolithography technology and, in this example, the through holes 15 for fuel feeding or oxygen feeding and the intercell separation through hole 16 were formed by the use of these methods.

The intercell separation through hole 16 is provided in the form of a slit between the unit cells, and is configured such that joining portions (corresponding to A7 and A8 shown in FIG. 2(b)) are cut off upon fabricating the fuel cell.

In this example, the portions A7 and A8 are removed upon fabricating the fuel cell, so that the separator members 10a and 1b of the separator member coupled body 10 are separated for the respective unit cells.

As a material of the metal base body used for the separator member coupled body 10, such a one is preferable that is excellent in electrical conductivity, can obtain a predetermined strength, and is excellent in processability, and there can be cited stainless steel, cold rolled steel, aluminum, or the like.

Further, as a method of disposing the acid-resistant and electrically conductive resin film onto the surface portion of the metal base body, there can be cited a method of forming a film through electrodeposition using a material composed by mixing a conductive material such as carbon particles or anticorrosive metal into resin, and heating to cure it, or a method of forming, through electrolytic polymerization, a film in the state wherein resin made of conductive polymers includes dopants that enhance conductivity, and so forth.

In the present invention, plating processing such as gold plating may be applied to the surface of the metal plate being the base body of the separator member coupled body 10 so as to provide an anticorrosive metal layer without impairing conductivity of the separator surface.

Further, in the present invention, the separator member coupled body 10 may also be configured that an acid-resistant and electrically conductive resin film is further disposed on the anticorrosive metal layer.

As a method of disposing the anticorrosive metal layer such as the gold plating layer, a usual plating processing method can be used, and details are omitted herein.

The foregoing electrodeposition is carried out in the state where anionic or cationic synthetic resin having an electrodepositing property is used as an electrodeposition liquid for electrodepositing a resin film, and a conductive material is dispersed in the electrodeposition liquid.

Although resin itself of the resin film formed by electrodeposition has no conductivity, because the film is formed in the state where the conductive material is mixed in the resin, the resin film exhibits conductivity.

As the anionic synthetic resin to be used, acrylic resin, polyester resin, maleic oil resin, polybutadiene resin, epoxy resin, polyamide resin, polyimide resin or the like can be used alone or as a mixture in optional combination of these resins.

Further, the foregoing anionic synthetic resin and cross-linking resin such as melamine resin, phenol resin or urethane resin may be used jointly.

As the cationic synthetic resin, acrylic resin, epoxy resin, urethane resin, polybutadiene resin, polyamide resin, polyimide resin or the like can be used alone or as a mixture in optional combination of them. Further, the foregoing cationic synthetic resin and cross-linking resin such as polyester resin or urethane resin may be used jointly.

Further, for giving viscosity to the foregoing resin, it is possible to add viscosity giving resin such as rosin, turpentine or petroleum resin if necessary.

The foregoing resin is subjected to an electrodeposition method in the state where it is neutralized by an alkaline or acid substance to be soluble in water, or in the state of water dispersion. Specifically, the anionic synthetic resin is neutralized by amine such as trimethylamine, diethylamine, dimethylethanolamine or diisopropanolamine, or inorganic alkali such as ammonia or potassium hydroxide. The cationic synthetic resin is neutralized by acid such as acetic acid, formic acid, propionic acid or lactic acid. Then, the resin neutralized to be soluble in water is used as a water dispersion type or a soluble type in the state where it is diluted with water.

In case of the resin film formation using electrodeposition, there can be cited carbon particles, anticorrosive metal or the like as a conductive material to be mixed in the resin, but not limited thereto as long as an acid-resistant and electrically conductive resin layer can be obtained.

Basically, electrolytic polymerization is a method wherein electrodes are immersed in an electrolytic solution containing aromatic compounds as monomers, thereby to perform polymerization through electrochemical oxidation or reduction. Since this method is well known, details are omitted herein.

Conductive polymers can be synthesized directly into a film shape by electrolytic polymerization, but, in this example, are in the state where the electrolytically polymerized resin contains dopants that increase conductivity.

For achieving the state where the electrolytically polymerized resin contains therein dopants that further increase conductivity, a method of electrochemical doping wherein dopants are contained upon electrolytic polymerization, a method of liquid phase doping wherein, after electrolytic polymerization, conductive resin (polymer) formed through the electrolytic polymerization is immersed into a dopant liquid itself or a solution containing dopant molecules, or the like can be used.

The dopants can be eliminated or neutralized by short-circuiting the cathode and the anode or applying a reverse voltage after the polymerization, and further, it is possible to perform doping and dedoping reversibly by further controlling the voltage, thereby to control the dopant concentration.

As donor-type dopants that give electrons, among dopants that are used for the resin film formation using electrolytic polymerization, there can be cited alkali metal, alkylammonium ions or the like. As acceptor-type dopants that snatch electrons, there can be cited halogen, Lewis acid, protonic acid, transition metal halide or organic acid.

As a material of the frame coupled bodies 12 and 13 arranged on the front and back sides of the separator member coupled body 10, such a one is preferable that is insulating, excellent in processability, light in weight, and large in mechanical strength. As such a material, a substrate material for a printed wiring board, or the like is used. For example, glass epoxy, polyimide or the like is used.

Formation of the frame coupled bodies 12 and 13 having a desired shape can be achieved by mechanical processing, laser processing or the like.

As a method of fabricating the separator 20 of this example, there can be cited a method wherein the separator member coupled body 10 and the frame coupled bodies 12 and 13 individually fabricated according to the foregoing methods or the like are joined together under pressure while positioning them, thereby fabricating it.

For example, there are a method of applying an adhesive such as epoxy resin and curing the adhesive while the respective parts are overlapped, thereby fixing them together, and so forth.

There is no particular limitation about the adhesive used in this case as long as it causes no influence onto other members in the fabrication process and, when employed in the fuel cell, it is excellent in resistance against an operating condition thereof.

Alternatively, there is also a method of forming part of or the whole of the frame coupled bodies by prepreg in a half-cured state, and joining them under pressure, thereby fixing them together.

Figure 1B:
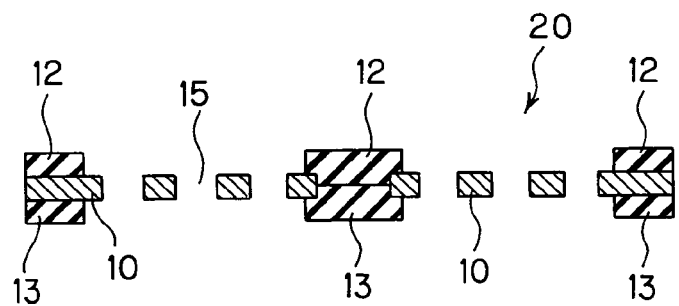
FIG. 1(b) is a sectional view taken along A1-A2 in FIG. 1(a)
Figure 1C:
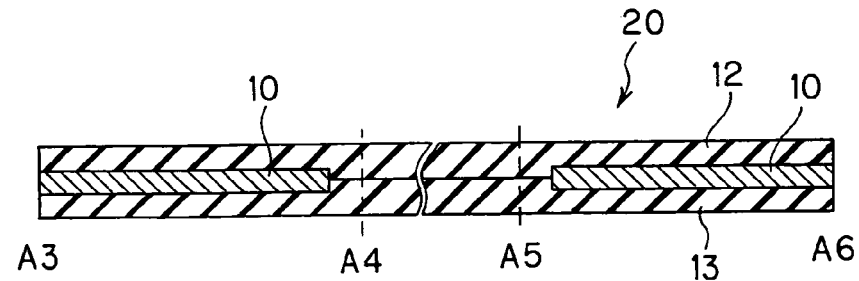
FIG. 1(c) is a sectional view taken along A3-A4-A5-A6 in FIG. 1(a).

As shown in FIGS. 1 and 2, the separator 20 of the first example is a separator for fabricating a fuel cell provided with two unit cells, while a separator for fabricating a fuel cell provided with three or more unit cells is similar thereto.

Specifically, as one similar to the first example, there can be cited a separator having a further separator member (corresponding to 10a, 10b in FIG. 1) for fabricating a fuel cell provided with three or more unit cells with the structure like the first example.

As a modification of the separator 20 of the first example, there can be cited one, as shown in FIG. 3, using a separator member coupled body 11 provided with groove portions 17 that are formed by half etching so as to be perpendicular to the through holes 15, instead of the separator member coupled body 10.

In this case, fuel or oxygen is fed in directions along the separator 20, and fed from fuel feed grooves or oxygen feed grooves 17a.

Also in case of this modification, portions B7 and B8 are removed upon fabricating a fuel cell, so that separator members 11a and 11b of the separator member coupled body 11 are separated for the respective unit cells.

Further, in the first example and the modification of the foregoing embodiment, there can be cited a mode in which the separator member coupled body is divided for the respective unit cells.

For example, it is the one in which A7 and A8 in FIGS. 1 and 2 are removed, the one in which B7 and B8 in FIG. 3 are removed, or the like.

Further, as another modification, there can also be cited one wherein the separator member coupled body 10 is not provided with the anticorrosive metal layer of gold plating or the like, but is provided with only the protective layer in the form of the anticorrosive and electrically conductive resin coating layer.

Further, in this example, the frame coupled body 12 is provided with the projecting portion 12c, and the frame coupled body 13 is provided with the projecting portion 13c. As a modification, however, it may also be configured that these projecting portions are not provided. In this case, for example, a member of the same material as that of the frame coupled bodies 12 and 13 is fitted into the intercell separation through hole 16 of the separator member coupled body 10, and the separator member coupled body 10 in this state is sandwiched by the frame coupled bodies 12 and 13 from both sides thereof so that the separator 20 is obtained.

Next, a second example of an embodiment of a separator for a flat-type polymer electrolyte fuel cell of the present invention will be cited.

In the second example, the frame coupled body on the fuel feed side or the oxygen feed side is replaced with a solid one. A plan view thereof is the same as FIG. 1(a), a sectional view corresponding to A3-A4-A5-A6 of FIG. 1(a) becomes the same as FIG. 1(c), while a sectional view corresponding to A1-A2 of FIG. 1(a) becomes like FIG. 4. FIG. 12 is a diagram showing respective members in FIG. 4 in positions that are spaced apart from each other.

Figure 4:
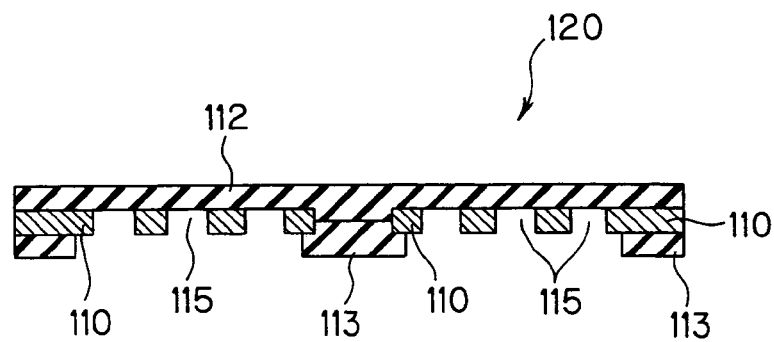
FIG. 4 is a sectional view showing a second example of an embodiment of a separator for a flat-type polymer electrolyte fuel cell of the present invention.
Figure 5A:
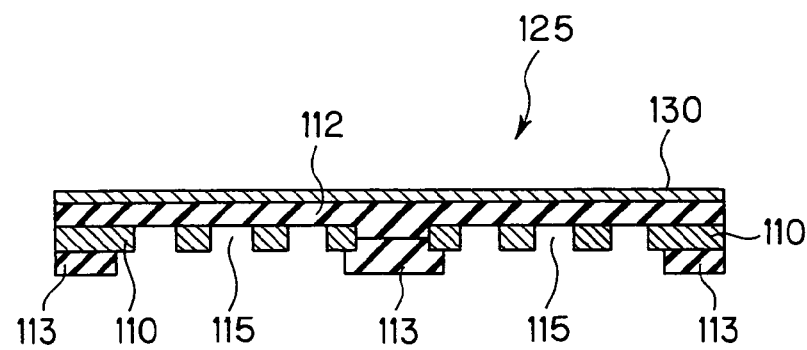
FIG. 5(a) is a sectional view showing a third example of an embodiment of a separator for a flat-type polymer electrolyte fuel cell of the present invention.
Figure 5B:
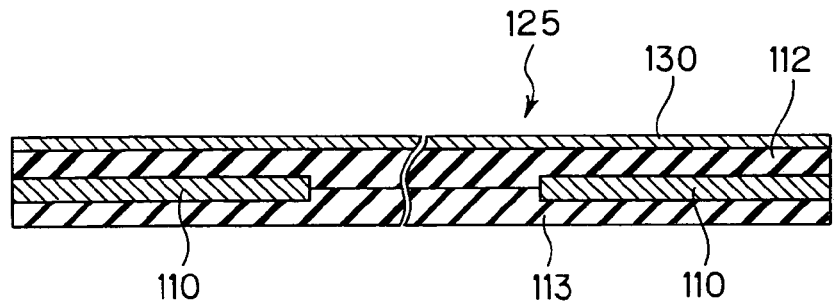
FIG. 5(b) is another sectional view of the third example.

As shown in FIG. 4, a separator 120 of the second example has a separator member coupled body 110 having a metal plate as a base body, a plate member 112 of a flat-plate shape disposed on one side of the separator member coupled body 110, and a frame coupled body 113 disposed on the other side of the separator member coupled body 110.

The plate member 112 is made of an insulating material. The frame coupled body 113 is made of an insulating material, and comprises frame portions for giving insulation between unit cells, which are integrally coupled to each other. The frame coupled body 113 has openings for fuel feeding or oxygen feeding, corresponding to separator members, respectively.

When the separator 120 of this example is applied to the fuel cell, the solid plate member 112 is subjected to processing so as to be formed with openings for fuel feeding or oxygen feeding.

With respect to the frame coupled body 113 and the solid plate member 112, the same material as that of the frame coupled bodies 12 and 13 in the first example is applicable. With respect also to the separator member coupled body 110, the same material as that of the separator member coupled body 10 of the first example is applicable.

Also as a modification of the second example, there can be cited one like the foregoing modification (see FIG. 3) of the first example.

Next, a third example of an embodiment of a separator for a flat-type polymer electrolyte fuel cell of the present invention will be cited.

In the third example, a conductive layer of copper foil or the like is further disposed on the whole surface of the solid plate member of the separator in the second embodiment. A plan view thereof is the same as FIG. 1(a), a sectional view corresponding to A1-A2 of FIG. 1(a) becomes like FIG. 5(a), and a sectional view corresponding to A3-A4-A5-A6 of FIG. 1(a) becomes like FIG. 5(b).

As shown in FIG. 5, a separator 125 of the third example has a separator member coupled body 110 having a metal plate as a base body, a frame coupled body 113 disposed on one side of the separator member coupled body 110, and a stacked base member comprising a plate member 112 of a flat-plate shape and a conductive layer 130 that are disposed on the other side of the separator member coupled body 110 in the order named. The conductive layer 130 is used for providing electrical connection when the separator of this example is offered for fabrication of the fuel cell, and is removed depending on necessity. Like in the second example, the solid plate member 112 is subjected to processing so as to be formed with openings for fuel feeding or oxygen feeding.

Copper foil or the like can be cited as the conductive layer 130 which, however, is not limited thereto.

Particularly, a one-side coppered substrate or the like can be cited as the stacked base member in the combination of the solid plate member 112 and the conductive layer 130.

The respective members other than the conductive layer 130 are basically the same as those of the second example.

Also as a modification of the third example, there can be cited one like the foregoing modification (see FIG. 3) of the first example.

Next, a fourth example of an embodiment of a separator for a flat-type polymer electrolyte fuel cell of the present invention will be cited.

A separator 20a for a flat-type polymer electrolyte fuel cell of the fourth example is formed by disposing sealing members in the separator 20 shown in FIG. 1. Specifically, as shown in FIG. 13, for enhancing airtightness of unit cells upon employment in the polymer electrolyte fuel cell, sealing members 18a and 18b are provided so as to surround the openings 12b and 13b of the frame coupled bodies 12 and 13.

The sealing member 18b is for sealing between the respective layers forming the separator 20a, while the sealing member 18a is for sealing between the separators 20a mutually upon assembly into the fuel cell.

In the fourth example, each of the sealing members 18a and 18b is of the type wherein a grooving process is applied to the frame coupled bodies 12 and 13, and an O-ring is fitted thereinto. For the O-ring, there is used fluoro rubber or the like that is sufficient in gas sealing property, moisture resistance, heat resistance, acid resistance, elasticity, and so on under the operating condition of the fuel cell.

The sealing members 18a and 18b may be formed by applying a liquid sealing agent onto the frame coupled bodies 12 and 13 by the use of a dispenser or screen printing. In this case, for example, the liquid sealing agent is applied onto grooved portions and cured so that the sealing members 18a and 18b can be formed.

As the liquid sealing agent, there is preferably used vulcanizate of perfluoro rubber, vulcanizate of liquid perfluoro rubber added with PTFE (abbreviation of polytetrafluoroethylene) fine powder as described in Laid-open Unexamined Patent Publication No. 2000-12054, and isobutylene series copolymer as described in Laid-open Unexamined Patent Publication No. 2001-325972, or the like.

The respective members other than the sealing members 18a and 18b are the same as those of the separator 20 of the first example shown in FIG. 1, and thus description thereof is omitted herein.

A method of fabricating the separator 20a of the fourth example is also basically the same as the case of the first example, and there can be cited a method wherein the separator member coupled body 10 and the frame coupled bodies 12 and 13 that are individually fabricated are joined together under pressure while positioning them, thereby fabricating it.

Of course, such a one having a structure wherein the sealing members are provided in the separator of the second example shown in FIG. 4 or of the third example shown in FIG. 5 can also be cited as one embodiment of a separator for a flat-type polymer electrolyte fuel cell of the present invention.

Next, a first example of an embodiment of a fuel cell of the present invention will be described based on FIG. 6.

Figure 6A:
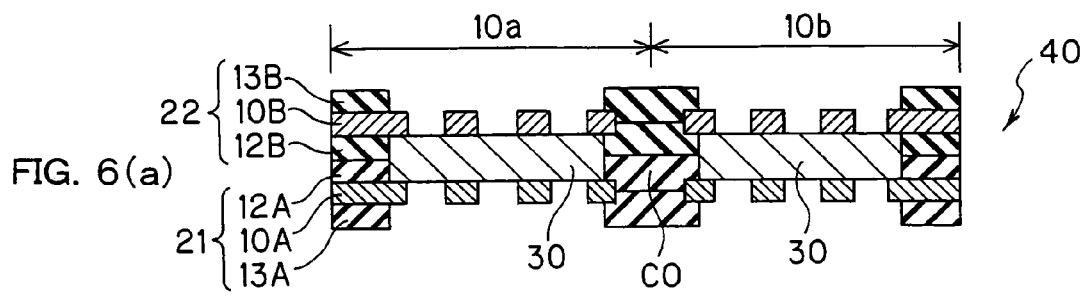
FIG. 6(a) is a sectional view of one example of an embodiment of a polymer electrolyte fuel cell of the present invention and is a sectional view in a C1-C2 section shown in FIG. 6(b)
Figure 6B:
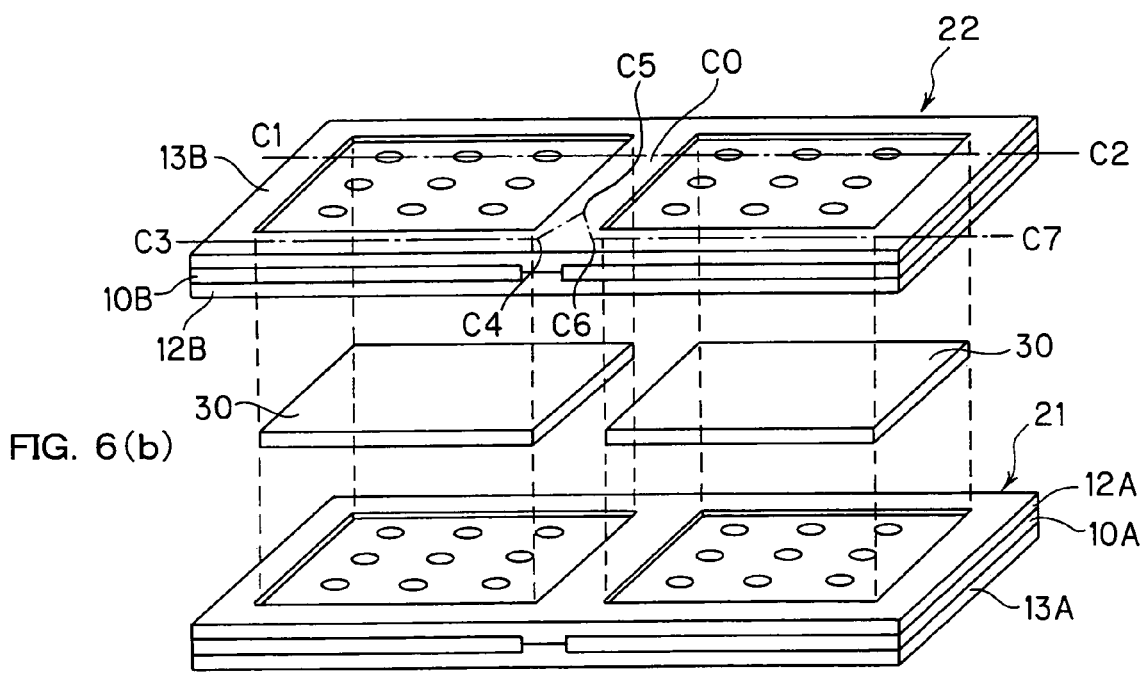
FIG. 6(b) is a bird's eye view of the polymer electrolyte fuel cell shown in FIG. 6(a)

For convenience' sake, electrical connection is omitted in FIGS. 6(*a*) and 6(*b*) and is shown only in FIG. 6(*c*).

This example is a flat-type polymer electrolyte fuel cell having unit cells arranged in a flat manner, wherein the separators (corresponding to 21 and 22 in FIG. 6(*a*)) for the flat-type polymer electrolyte fuel cell of the first example shown in FIG. 1 are used on both the fuel feeding side and the oxygen feeding side. Further, membrane electrode assemblies (MEAs) 30 of the fuel cell are disposed so as to be fitted into openings of frame portions (12A, 12B) of one of frame coupled bodies arranged on the front and back sides of each of separator member coupled bodies 10A and 10B.

Of course, in this example, the joining portions A7 and A8 of the separator member coupled body 10 of the separator 20 shown in FIG. 1 are removed, thereby being separated for the respective unit cells.

Therefore, in this case, the separator 21, using the frame coupled bodies 12A and 13A, sandwiches such ones (also referred to as a separator group) 10A that are in the state where the separator member coupled body is divided for the respective unit cells, while the separator 22, using the frame coupled bodies 12B and 13B, sandwiches such ones (also referred to as a separator group) 10B that are in the state where the separator member coupled body is divided for the respective unit cells.

A combined thickness of the frame coupled bodies 12A and 12B between the ones (also referred to as separator groups) 10A and 10B each in the state where the separator member coupled body is divided for the respective unit cells, is substantially equal to a thickness of the membrane electrode assembly (MEA) 30 so that the MEA can be provided in a flat manner.

In this example, at a portion C0 separating the unit cells from each other, which corresponds to the region of the intercell separation through hole portion 16 in FIG. 2(*b*), only the frame coupled bodies exist while being closely contacted with each other.

The number of the unit cells is set to two. On the other hand, as one similar to this example, there can be cited a fuel cell that is provided with three or more unit cells with a structure like this example, by increasing a separator member (corresponding to 10a, 10b in FIG. 1).

Herein, the frame coupled bodies 12A and 13A and the frame coupled bodies 12B and 13B, respectively, not only insulate the respective unit cells at portions other than connecting portions of the separator members, but also, simultaneously, serve as sealing members for preventing fuel, moisture etc. inside the cells from leaking out to the exterior of the cells from portions other than the fuel feed surfaces while sandwiching the MEAs.

Figure 7:
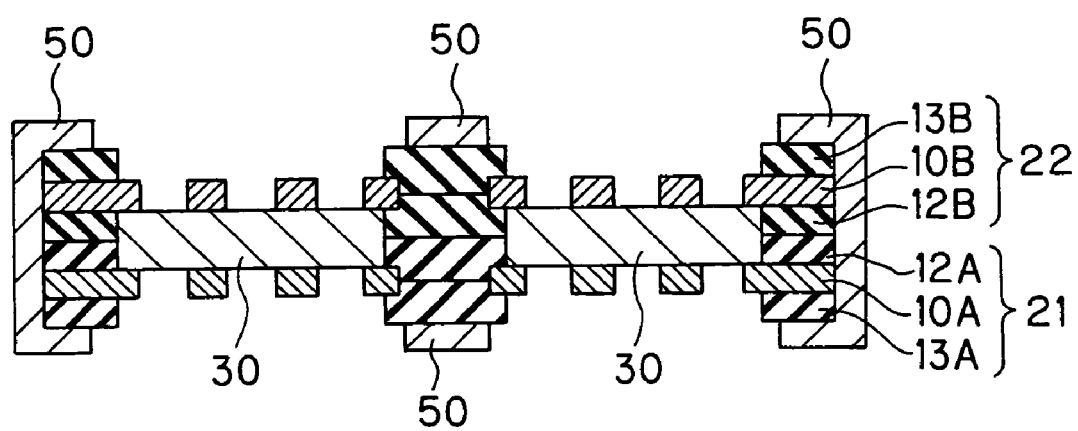
FIG. 7 is a sectional view of a fuel cell showing the state wherein a housing is provided.

As methods for closely contacting and retaining the separators 21 and 22, there can be cited the following methods. First, there is a method of using an insulating adhesive between the respective members. Secondly, there is a method wherein part of or the whole of the frame coupled bodies 12A and 12B is formed from resin in a half-cured state such as prepreg and, after overlapping the respective members, thermo-compression bonding is applied thereto in a lump. Further, thirdly, there can be cited a method wherein the respective layers are stacked, then mechanically retained from the external by the use of a housing 50 as shown in FIG. 7, or the like.

In the first method, in the state where an adhesive such as epoxy resin is applied and the respective members are overlapped with each other, the adhesive is cured. There is no particular limitation about the adhesive used in this case as long as it causes no influence onto other members in the fabrication process, and it is excellent in resistance against an operating condition of the fuel cell. Further, instead of the adhesive, a resin sheet in a half-cured state such as prepreg that is used in a printed board, may be inserted.

In the second method, by replacing part of or the whole of the frame coupled bodies 12A and 12B with resin sheets in a half-cured state such as prepreg, it is possible to further simplify the process. That is, the fuel cell is fixed by performing thermo-compression bonding in the state where the respective members are overlapped with each other. In this case, there is no particular limitation about the used resin sheet in the half-cured state as long as it causes no influence onto other members in the fabrication process, and it is excellent in resistance against an operating condition of the fuel cell.

The third method is the easiest and simplest method, wherein the cell body may be assembled using a construction body such as the housing 50 for fixing and retaining the fuel cell.

One example of a fabricating method of the fuel cell in this example will be briefly described.

First, with respect to two separators each being the same as the separator 20 shown in FIG. 1, the joining portions A7 and A8 (see FIG. 2(*b*)) of the respective separator member coupled bodies 10 are removed so as to prepare the separators 21 and 22 that are divided for the respective unit cells.

Further, the membrane electrode assemblies (MEAs) 30 are prepared.

Then, the membrane electrode assemblies. (MEAs) 30 are placed on the openings of the frame coupled body 12A of the separator 21. Subsequently, the separator 22 is overlapped over the separator 21 so that the frame coupled body 12B of the separator 22 is positioned over the membrane electrode assemblies (MEAs) 30, then they are joined together under pressure. This enables the separator 21 and the separator 22 to sandwich the membrane electrode assemblies (MEAs) 30 therebetween in a fitted manner.

As a method of retaining the membrane electrode assemblies (MEAs) between the separators 21 and 22, the foregoing first to third methods are adopted.

Then, electrical connection of the separator members is carried out for connecting the unit cells in series, thereby fabricating the fuel cell.

Figure 6C:
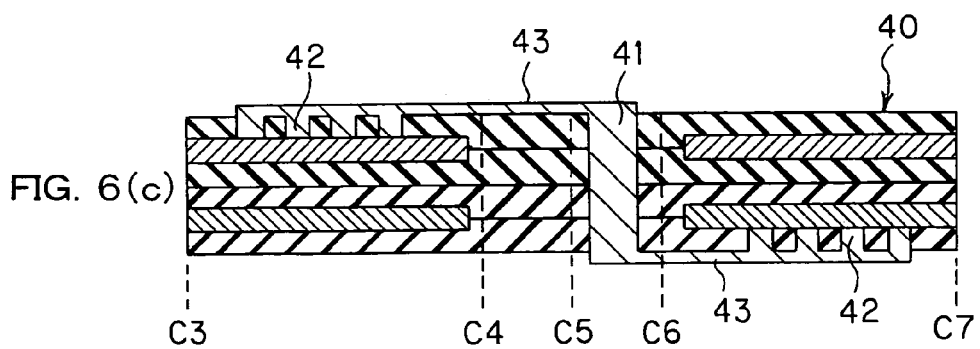
FIG. 6(c) is a sectional view showing a wiring state in a C3-C4-C5-C6-C7 section shown in FIG. 6(b).

In the fuel cell of this example, the electrical connection of the separator members is performed using a filled via forming method that uses conductive paste and is known as a wiring board fabricating technology, and the connection is achieved as shown in FIG. 6(c).

In this example, the joining portions A7 and A8 are removed in advance so that the separators 21 and 22 that are divided for the respective unit cells are used. On the other hand, if the separator 20, as shown in FIG. 1, having the frame coupled body 10 whose joining portions A7 and A8 are not removed is used, the joining portions A7 and A8, for the unit cells, of the frame coupled body 10 may be finally cut off so that the polymer electrolyte fuel cell of this example can be obtained.

Herein, the electrical connection of the separator members between the unit cells in the fuel cell of this example will be described based on FIG. 8.

FIG. 8 shows process sectional views taken along C3-C4-C5-C6-C7 in FIG. 6.

Figure 8A:
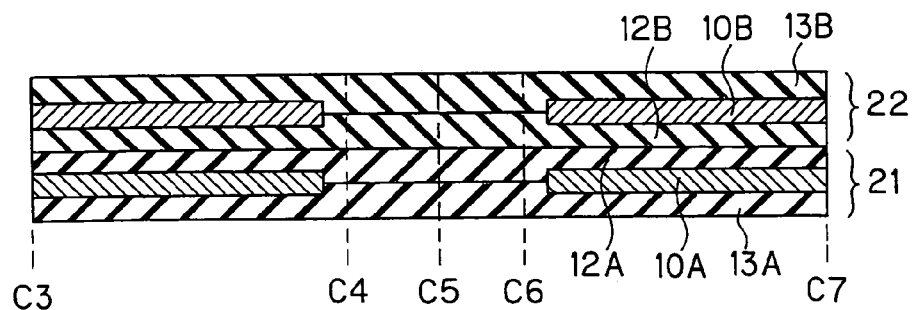
FIG. 8 is a process diagram of a fabricating method of the fuel cell shown in FIG. 6.
Figure 8B:
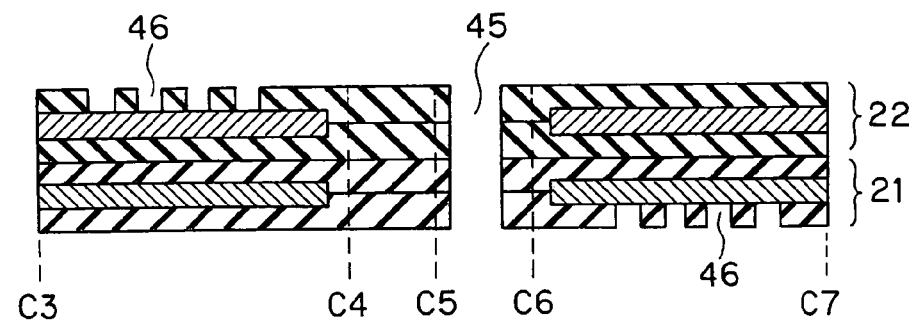

The separator 21 and the separator 22 are overlapped so as to sandwich therebetween the membrane electrode assemblies (MEAs) 30, and joined together under pressure, so that the membrane electrode assemblies (MEAs) 30 are fitted therebetween (FIG. 8(a)). Thereafter, by the use of a drill or laser irradiation, a through hole 45 is formed between C5-C6, and hole portions 46 for connection to the separator members are formed in the frame coupled bodies 13A and 13B (FIG. 8(b)).

Figure 8C:
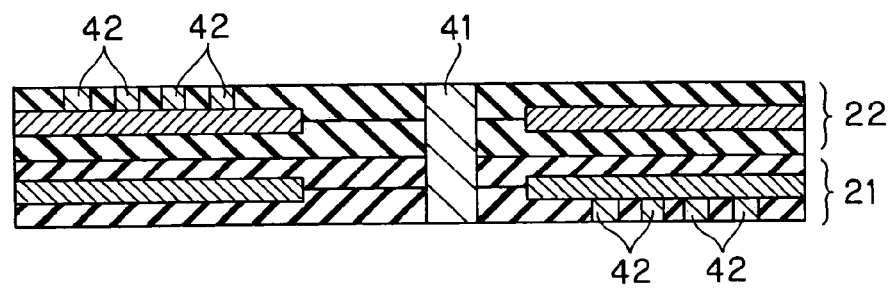
Figure 8D:
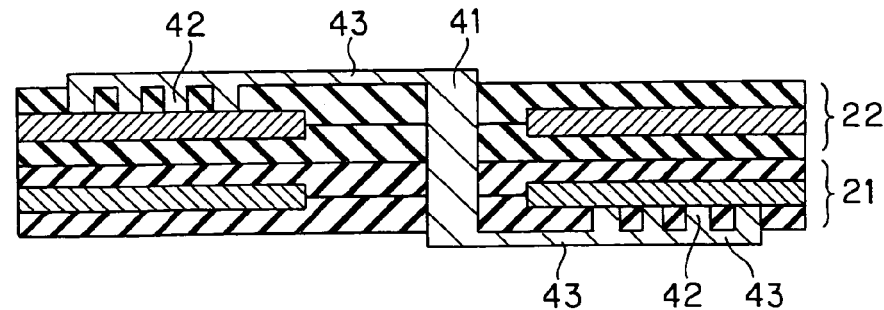

Then, by the use of a dispenser or a printing method such as screen printing, conductive paste is filled in the through hole 45 and the hole portions 46 thereby to form filled vias 41 and 42 (FIG. 8(c)). Thereafter, by the use of the dispenser or the printing method, wiring 43 is further formed using the conductive paste (FIG. 8(d)).

For example, in case of the filling into the through hole 45, the conductive paste is applied using the screen printing or the like and, by disposing an aspirator on the opposite side of the substrate subjected to the hole processing to perform pressure reduction, the conductive paste can be filled into the through hole 45.

Thereafter, processes such as drying and burning are carried out depending on necessity, and the electrical connection between the separator members is completed.

As the conductive paste, silver paste, copper paste, gold paste, palladium paste, palladium-silver paste or the like may be cited.

As a first modification of the fuel cell in this example, there can be cited one wherein electrical connection of the separator members between the unit cells is implemented using bumps (also referred to as projecting electrodes) as shown in FIG. 9(c).

FIG. 9 shows process sectional views in positions corresponding to C3-C4-C5-C6-C7 in FIG. 6.

Hereinbelow, the electrical connection of the separator members between the unit cells in the fuel cell of this first modification will be briefly described based on FIG. 9.

In case of the first modification, as different from the case of the fuel cell in the example of the embodiment shown in FIG. 6, the separator 120 (see FIG. 4) of the second example provided with the solid plate member 112 on one side of the separator member coupled body 110 is used on both the fuel feed side and the oxygen feed side. In this example, membrane electrode assemblies (MEAs) 30 of the fuel cell are disposed so as to be fitted into openings of a frame coupled body 113A of a used separator 121 and a frame coupled body 113B of a used separator 122.

Hereinbelow, the electrical connection of the separator members between the unit cells in this fuel cell will be briefly described based on FIG. 9.

With respect to two separators each being the same as the separator 120 shown in FIG. 4, the joining portions A7 and A8 (see FIG. 2(b)) of the respective separator member coupled bodies 110 are removed in advance so as to prepare the separators 121 and 122 that are divided for the respective unit cells.

Further, the membrane electrode assemblies (MEAs) 30 are also prepared in advance.

Then, the separator 121 and the separator 122 are overlapped so as to sandwich therebetween the membrane electrode assemblies (MEAs) 30, and joined together under pressure, so that the membrane electrode assemblies (MEAs) 30 are fitted therebetween. Thereafter, copper foils 61 formed with conductive bumps 62 and 63 are prepared (FIG. 9(a)), and stacked on both sides thereof (FIG. 9(b)).

As a method of overlapping, closely contacting and retaining these members, the same method as that in the foregoing example of the embodiment is applicable.

As the bump 62 or 63, one obtained by printing conductive paste a plurality of times to form it into a bump, a wire bump, one obtained by further coating the wire bump with conductive paste, or the like may be applied.

Upon forming the bump, it is necessary to ensure a predetermined height of the bump portion and sharpen its tip.

Thereafter, the copper foils 61 are etched by a photoetching method to form wiring 61a, and the electrical connection between the separator members is completed (FIG. 9(c)).

Finally, the solid plate members 112A and 112B are formed with openings for fuel feeding and openings for oxygen feeding (not shown), respectively.

As a method of forming the opening portions, there can be cited a method using a carbon dioxide gas laser, a method by the use of mechanical processing, or the like.

By this, it becomes unnecessary to protect the fuel feed portion from the external environment during the fabrication process, so that the degree of freedom of the fabrication process is increased and handling is also facilitated.

As a second modification of the fuel cell of this example, there can be cited one wherein electrical connection of separator members between unit cells is implemented using plated through holes as shown in FIG. 10(d).

FIG. 10 also shows process sectional views in positions corresponding to C3-C4-C5-C6-C7 in FIG. 6.

In case of the second modification, as different from the case of the fuel cell in the example of the embodiment shown in FIG. 6, the separator 125 (see FIG. 5) of the third example provided with the solid plate member 112 and the conductive layer 130 in the form of copper foil as shown in FIG. 5 on one side of the separator member coupled body 110 is used on both the fuel feed side and the oxygen feed side. In this example, membrane electrode assemblies (MEAs) 30 of the fuel cell are disposed so as to be fitted into openings of a frame coupled body 113A of a used separator 126 and a frame coupled body 113B of a used separator 127.

As a stacked base member comprising the solid plate member 112 and the conductive layer 130 in the form of the copper foil, a one-side coppered glass epoxy substrate or the like is applicable.

Hereinbelow, the electrical connection of the separator members between the unit cells in this fuel cell will be briefly described based on FIG. 10.

With respect to two separators each being the same as the separator 125 shown in FIG. 5, the joining portions A7 and A8 (see FIG. 2(b)) of the respective separator member coupled bodies 110 are removed in advance so as to prepare the separators 126 and 127 that are divided for the respective unit cells.

Further, the membrane electrode assemblies (MEAs) 30 are also prepared in advance.

Then, the separator 126 and the separator 127 are overlapped so as to sandwich therebetween the membrane electrode assemblies (MEAs) 30, and joined together under pressure, so that the membrane electrode assemblies (MEAs) 30 are fitted therebetween. Thereafter, copper foils 65 are stacked on both sides thereof (FIG. 10(a)).

As a method of overlapping, closely contacting and retaining these members, the same method as that in the foregoing example of the embodiment is applicable.

Then, at portions where connecting portions are formed, vias 42A and a through hole 45A for forming a through hole connecting portion are perforated by the use of a drill or a laser (FIG. 10(b)).

Then, after performing a desmear process and a catalyst applying process, electroless plating is applied to the whole surface including surface portions of the via portions 42A and the through hole portion 45A thereby to fill the through holes with a plating layer 70, so that the front and the back become electrically connectable (FIG. 10(c)).

As the electroless plating, electroless nickel plating, electroless copper plating or the like is suitably performed.

The electroless plating is performed using a prescribed plating liquid, after carrying out an activation process with a catalyst. Normally, copper plating is implemented.

Then, resist photoengraving is performed on the whole front and back surfaces, and plating layer portions exposed from the resist is etched using a ferric chloride liquid or the like as an etching liquid to form connection wiring 43a. Thereafter, removal of the resist, and a cleaning process if necessary, are carried out, thereby to obtain the polymer electrolyte fuel cell of this example.

Herein, the through hole is filled with the plating layer, but not limited thereto. For example, an ordinary through hole connecting portion may be formed such that the through hole may be formed to be large and, when the front and the back are made electrically connectable by the plating, the through hole still penetrates through between the front and the back.

Then, by the use of the photoetching method, the plating layer 70 and the copper foils 65 are etched into predetermined shapes to form the wiring portion 43a, and the electrical connection between the separators is completed (FIG. 10(d)).

Finally, the solid plate members 112A and 112B are formed with openings for fuel feeding and openings for oxygen feeding (not shown), respectively.

As a method of forming the opening portions, there can be cited a method using a carbon dioxide gas laser, a method by the use of mechanical processing, or the like.

By this, it becomes unnecessary to protect the fuel feed portion from the external environment during the fabrication process, so that the degree of freedom of the fabrication process is increased and handling is also facilitated.

Next, a second example of an embodiment of a fuel cell of the present invention will be described based on FIG. 14.

For convenience' sake, it is shown without electrical connection.

The second example is also a flat-type polymer electrolyte fuel cell having unit cells arranged in a flat manner. In this example, separators 21a and 22a of the flat-type polymer electrolyte fuel cell of the fourth example shown in FIG. 13 are used on both the fuel feed side and the oxygen feed side. Like in the first example, membrane electrode assemblies (MEAs) 30 of the fuel cell are disposed so as to be fitted into openings of one (12A, 12B) of frame coupled bodies arranged on the front and the back of each of separator member coupled bodies 10A and 10B.

Further, separator members between unit cells are electrically connected through the foregoing filled via connection shown in FIG. 8.

Also in this second example, like the case of the first example, joining portions (corresponding to the portions A7 and A8 in FIG. 2) of the separator member coupled body 10 of the separator 20a shown in FIG. 13 are removed, thereby being separated for the respective unit cells.

As described above, this example is configured to use the separators 20a (corresponding to 21a and 22a in FIG. 14) of the fourth example in the flat-type polymer electrolyte fuel cell of the first example shown in FIG. 6, instead of the separators 20 of the first example. Sealing members 18b seal between the respective layers of the separators 21a and 22a, while sealing members 18a seal between the separators 21a and 22a mutually. Accordingly, as compared with the case of the flat-type polymer electrolyte fuel cell of the first example shown in FIG. 6 wherein no sealing members are provided, airtightness of the unit cells is improved.

The respective members other than the separators 20a are basically the same as those of the flat-type polymer electrolyte fuel cell of the first example, and a fabricating method is also basically the same.

As a modification of the flat-type polymer electrolyte fuel cell of the second example, there can be cited one wherein electrical connection of the separator members between the unit cells is implemented by the foregoing bump connection shown in FIG. 9, or the foregoing through hole connection shown in FIG. 10.

Of course, a flat-type polymer electrolyte fuel cell using such a one having a structure wherein the sealing members are provided in the separator of the second example shown in FIG. 4 or of the third example shown in FIG. 5 can also be cited as one of flat-type polymer electrolyte fuel cells of the present invention.

INDUSTRIAL APPLICABILITY

As described above, a separator of the present invention can be used in a flat-type polymer electrolyte fuel cell, and the flat-type polymer electrolyte fuel cell using the separator of the present invention can realize reduction in weight, improvement in strength, and further, improvement in airtightness of each unit cell.

The invention claimed is:

1. A separator for a polymer electrolyte fuel cell having unit cells arranged in a flat manner, said separator provided on a fuel feed side or an oxygen feed side, said separator comprising:

a separator member coupled body having a metal plate as a base body, and formed by integrally coupling a plurality of separator members each having through holes for feeding fuel to an electrolyte of the fuel cell, said through holes arranged so as to correspond to the unit cell and to be perpendicular to a surface of said base body, and frame coupled bodies each made of an insulating material, each having openings for fuel feeding or oxygen feeding corresponding to the respective separator members, and each formed by integrally coupling a plurality of frame members that give insulation between the unit cells, wherein said frame coupled bodies, making a pair, sandwich said separator member coupled body from both sides of the separator member, and each frame member of one of the frame coupled bodies on the front and back of said separator member coupled body is configured to accommodate a membrane electrode assembly of the fuel cell into said respective volume of an opening of said each frame member.

2. A separator for a polymer electrolyte fuel cell according to claim 1, wherein said frame coupled bodies are provided with grooves, and an O-ring is disposed in said grooves as a sealing member.

3. A separator for a polymer electrolyte fuel cell according to claim 1, wherein sealing members disposed by a dispenser are provided between the separator member coupled body and the frame coupled bodies forming the separator, and on surfaces of the frame coupled bodies.

4. A separator for a polymer electrolyte fuel cell according to claim 1, wherein sealing members disposed by printing are provided between the separator member coupled body and the frame coupled bodies forming the separator, and on surfaces of the frame coupled bodies.

5. A separator for a polymer electrolyte fuel cell according to claim 1 wherein the separator member has, on one surface thereof, a groove portion communicating with said through holes.

6. A separator for a polymer electrolyte fuel cell according to claim 5, wherein said groove portion is formed by half etching.

7. A separator for a polymer electrolyte fuel cell according to claim 1, wherein the separator member has an anticorrosive metal layer that does not impair conductivity of the surface thereof.

8. A separator for a polymer electrolyte fuel cell according to claim 1, wherein the separator member has a weak acid resistant anticorrosive and electrically conductive resin coating film on at least a surface that will be on the side of the electrolyte of the fuel cell.

9. A separator for a polymer electrolyte fuel cell according to claim 8, wherein said resin coating film is a resin coating film formed by electrodeposition, electrolytic polymerization, or a combination of both.

* * * * *